United States Patent
Das et al.

(10) Patent No.: US 12,270,448 B2
(45) Date of Patent: Apr. 8, 2025

(54) PROPELLER SHAFT DAMPER WITH RETENTION LIP

(71) Applicant: Neapco Intellectual Property Holdings, LLC, Farmington Hills, MI (US)

(72) Inventors: Niladri S. Das, Northville, MI (US); Robert J. Wehner, Livonia, MI (US); James B. White, Windsor (CA)

(73) Assignee: Neapco Intellectual Property Holdings, LLC, Farmington Hills, MI (US)

( * ) Notice: Subject to any disclaimer, the term of this patent is extended or adjusted under 35 U.S.C. 154(b) by 465 days.

(21) Appl. No.: 17/840,693

(22) Filed: Jun. 15, 2022

(65) Prior Publication Data

US 2022/0397180 A1 Dec. 15, 2022

Related U.S. Application Data

(60) Provisional application No. 63/210,605, filed on Jun. 15, 2021.

(51) Int. Cl.
| | |
|---|---|
| *F16F 15/14* | (2006.01) |
| *F16C 3/02* | (2006.01) |
| *F16F 15/32* | (2006.01) |

(52) U.S. Cl.
CPC ............ *F16F 15/1442* (2013.01); *F16C 3/02* (2013.01); *F16C 2326/06* (2013.01); *F16D 2300/22* (2013.01); *F16F 15/322* (2013.01)

(58) Field of Classification Search
CPC ....... F16F 15/1442; F16F 15/322; F16C 3/02; F16C 2326/06; F16D 2300/22

USPC ......................................................... 464/127
See application file for complete search history.

(56) References Cited

U.S. PATENT DOCUMENTS

| | | | |
|---|---|---|---|
| 4,041,803 A * | 8/1977 | Goloff ................ | F16F 15/1442 |
| 7,178,423 B2 | 2/2007 | Breese et al. | |
| 9,017,175 B2 | 4/2015 | Creek | |
| 9,267,546 B2 * | 2/2016 | Altan ................. | F16F 15/1442 |
| 2021/0088082 A1 * | 3/2021 | Budde .................... | F16D 3/387 |

FOREIGN PATENT DOCUMENTS

| | | | | |
|---|---|---|---|---|
| JP | 5-223140 A | * | 8/1993 | .................... 464/127 |

* cited by examiner

*Primary Examiner* — Greg Binda
(74) *Attorney, Agent, or Firm* — Dickinson Wright PLLC

(57) ABSTRACT

A propeller shaft assembly includes a propeller shaft extending along an axis between a first and second shaft end. A propeller shaft yoke is operably connected to one of the first or second shaft ends and includes a body presenting a mounting surface extending circumferentially about the axis. A tuned damper extends radially outwardly from the mounting surface and includes a first damper ring disposed in abutting and encircling relationship with the mounting surface and a second damper ring disposed in abutting and encircling relationship with the first damper ring. The tuned damper includes a retention lip extending radially downwardly from the second damper ring in axially spaced relationship with the mounting hub by an axial spacing distance D for protecting the tuned damper from axial impact forces and improving the robustness of the tuned damper mounted on the mounting surface.

20 Claims, 7 Drawing Sheets

PROPELLER SHAFT DAMPER WITH RETENTION LIP

CROSS REFERENCE TO RELATED APPLICATION

The subject application claims priority to U.S. Provisional Application Ser. No. 63/210,605 filed on Jun. 15, 2021, the entire disclosure of which is incorporated herein by reference.

BACKGROUND OF THE INVENTION

1. Field of the Invention

The present disclosure relates generally to single or multi-piece propeller shafts. More particularly, the present disclosure relates to a tuned damper for a single or multi-piece propeller shaft.

2. Description of the Related Art

This section of the written disclosure provides background information related to propeller shafts which is not necessarily prior art to the inventive concepts disclosed and claimed in this application.

Technological advancements continue to improve the performance of automobiles, including the reduction of noise and vibration due to rotating components, such as driveline components. Dampers, such as tuned dampers (e.g., to dampen torsional, radial, and/or axial vibrations), are used on automobile driveline components, such as, but not limited to, propeller shafts to reduce noise and/or vibration that may occur during operation of the automobile driveline. Tuned dampers may be disposed at various locations on propeller shafts due to a number of factors, such as clearance of other surrounding driveline components throughout the operational range of the automobile. Some propeller shafts are configured in more than one piece (i.e., multi-piece), due to driveline configurations, among other reasons. These single or multi-piece propeller shafts, particularly when utilized in truck, sport utility vehicles (SUV) and sports car applications, are often configured with a tuned damper commonly mounted to propeller shaft yokes (e.g., slip yokes, stud yokes and flange yokes), often for the purpose of absorbing torsional vibration energy originating from rotating gear teeth in axles, transmissions, or other adjacent vehicle components.

For example, with reference to FIGS. 3-4, prior art applications include integrating a tuned damper into the flange yoke (FIG. 3) or slip yoke (FIG. 4) by radial compression of a tuned elastomeric ring element. More specifically, as best illustrated in FIGS. 3 and 4, tuned dampers are commonly mounted on a machined outer surface or mounting hub of the propeller shaft yokes, and include an elastomeric or rubber damping ring, and a rigid inertia mass ring to create a tuned damper that absorbs torsional or radial vibration energy present in the driveline system. Historically, when the tuned dampers are applied to the machined outer surface or mounting hub, the rigid inertia mass ring and the elastomeric damping ring are press fit over the propeller shaft yokes, with radial compression of the elastomeric damping ring securing both the elastomeric damping ring and the rigid inertia mass ring to the propeller shaft yoke.

Friction between the elastomeric damper ring and the metal components may be reduced temporarily for assembly using a lubricant or emulsifier that evaporates or absorbs into the elastomer once assembly is complete. However, reliance on frictional forces from radial compression of the elastomeric damper ring as the only method of securing the elastomer ring and the inertia mass ring to the propeller shaft yoke provides the potential for the tuned damper to be dislodged from the propeller shaft yoke. More specifically, if the tuned damper is struck or impacted during vehicle use or during shipping or handling of the propeller shaft, this can result in the damper inertia ring becoming dislodged from the propeller shaft yoke, causing eventual separation of the tuned damper from the propeller shaft and corresponding complaints of underbody noise.

Conventional attempts to resolve this concern involve the use of adhesive bonding between the machined outer surface of the propeller shaft yoke and the tuned damper. In other words, to improve the retention of a tuned damper to a propeller shaft yoke, the elastomeric damper ring may be adhesively bonded to the propeller shaft yoke, the mass inertia ring, or both components. This effectively increases the load required to dislodge the mass inertia ring from its intended position, by reducing the likelihood of slippage of the elastomeric damper ring, often requiring the elastomeric damper ring to be fractured or sheared at a substantially higher impact load as compared to slipping of the elastomeric damper ring when adhesive bonding is not present. However, a drawback of using adhesive is that consistent bonding to elastomeric materials requires the addition of manufacturing steps (and cost) to clean and prepare the bonding surfaces, apply the adhesive, and then cure the adhesive with heating. While this provides an increase in the force required to separate a damper inertia ring from an impact, this improvement may not be sufficient in all cases, especially where impact loads are severe. More specifically, the interference fit and/or adhesive bond used to secure the elastomeric damper ring and the outer mass inertia ring is occasionally insufficient to prevent undesired separation from the rotating propeller shaft yoke if an unintended impact force is applied axially against the inertia ring. This may occur during the following activities:

- shipping or handling for the damper and yoke subassembly;
- propeller shaft assembly operations;
- propeller shaft shipping and handling;
- vehicle assembly operations;
- underbody contact with road obstacles during vehicle operation; and
- underbody contact with supports or tow straps during vehicle shipping or tow recovery.

Thus, as will be appreciated from the aforementioned disclosure, the prior art methods of attaching the tuned damper to the propeller shaft does not provide a process which is capable of protecting the tuned damper against all axial loads. As previously mentioned, if an axial load of high enough force is applied to the tuned damper and not the propeller shaft yoke, then the tuned damper may become dislodged (partially or fully), which could lead to immediate or later failure of the ring operation on the propeller shaft, with the potential to completely fall off with usage. Accordingly, there remains a need for an improved means of protecting a tuned damper secured to the propeller shaft yoke.

SUMMARY OF THE INVENTION

This section provides a general summary of the invention and is not intended to be a comprehensive disclosure of its full scope, aspects, objectives, and/or all of its features.

In accordance with an aspect of the present disclosure, a tuned damper of the propeller shaft yoke includes a retention lip extending radially downwardly from the second damper ring in axially spaced relationship with the mounting hub by an axial spacing distance to provide a protective mechanical shield that prevents dislodging of the tuned damper from axial forces applied during contact with another object, whether during shipping, vehicle assembly, or vehicle use. Put another way, the retention lip, which is preferably integrally formed with the second damper ring, limits axial displacement that can occur during an impact. The axial spacing of the retention lip from the mounting hub presenting the mounting surface also ensures that the second damper ring can resonate or oscillate rotationally with respect to the mounting surface to perform its dynamic damping function at the targeted tuning frequency, without grounding statically against the mounting hub to which the first damper ring is mounted. Thus, a tuned damper which incorporates the retention lip in accordance with the subject disclosure improves the robustness of the tuned damper relative to prior art designs, preventing disassembly induced by external forces while minimizing the potential for build-up of contaminants that may otherwise interfere with the function of the tuned damper.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Example embodiments will now be described more fully with reference to the accompanying drawings. The example embodiments are provided so that this disclosure will be thorough and fully convey the scope to those skilled in the art. Numerous specific details are set forth such as examples of specific components, devices, mechanisms, assemblies, and methods to provide a thorough understanding of various embodiments of the present disclosure. It will be apparent to those skilled in the art that specific details need not be employed, that example embodiments may be embodied in many different forms, and that neither should be construed to limit the scope of the disclosure. In some examples, well-known processes, well-known device structures, and well-known technologies are not described in detail.

Referring to the Figures, wherein like numerals indicate corresponding parts throughout the several views, a propeller shaft assembly 10 for a vehicle is provided. It should be appreciated that the subject propeller shaft assembly 10 may be employed for various vehicles, including but not limited to automobiles and recreational vehicles (RVs).

Figure 1:
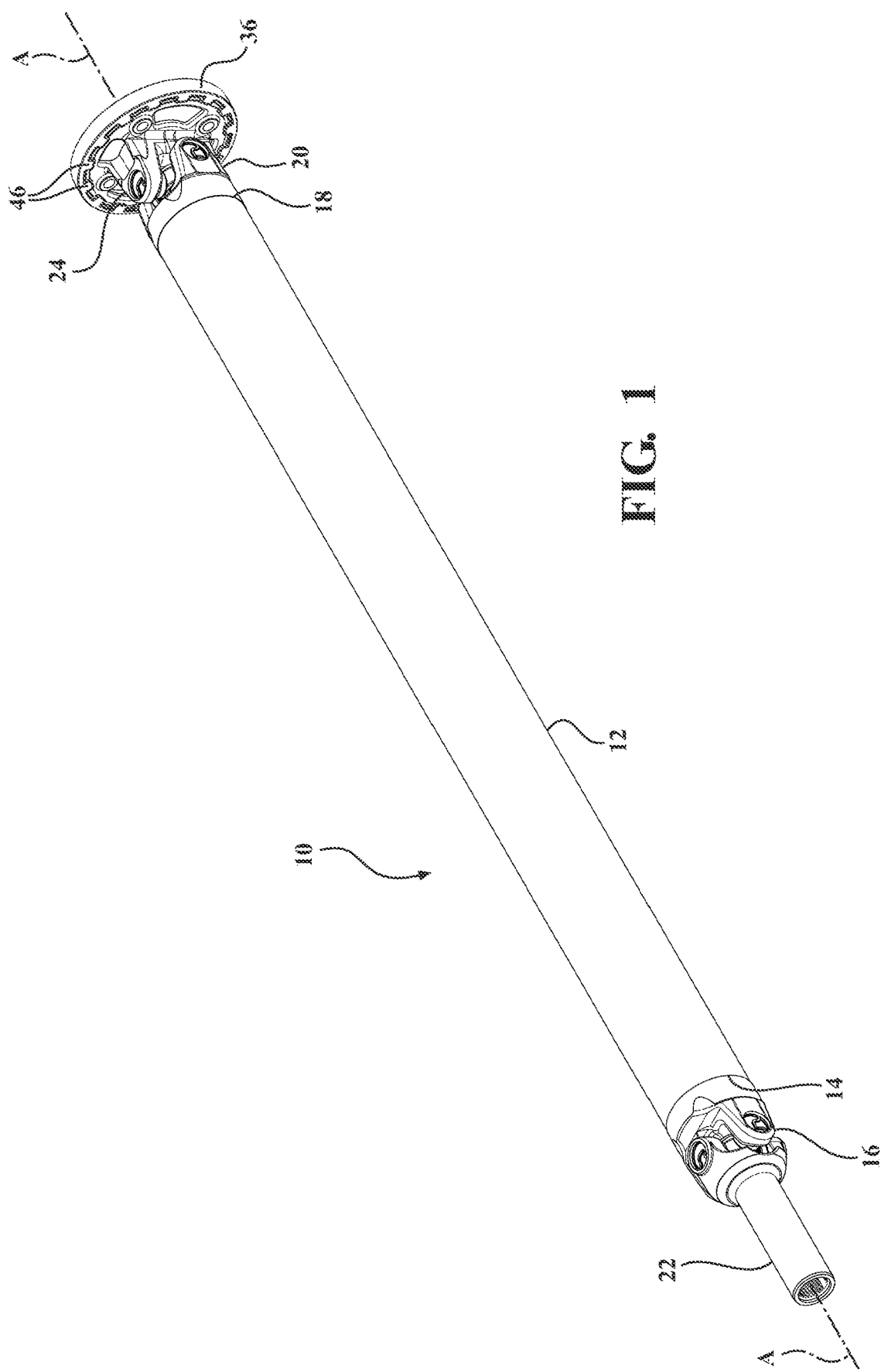
FIG. 1 is a perspective view of a propeller shaft assembly including a propeller shaft extending along an axis between a first shaft end and a second shaft end, with a first propeller shaft yoke operable connected to the first shaft end and a second propeller shaft yoke having a tuned damper operably connected to the second shaft end.
Figure 2:
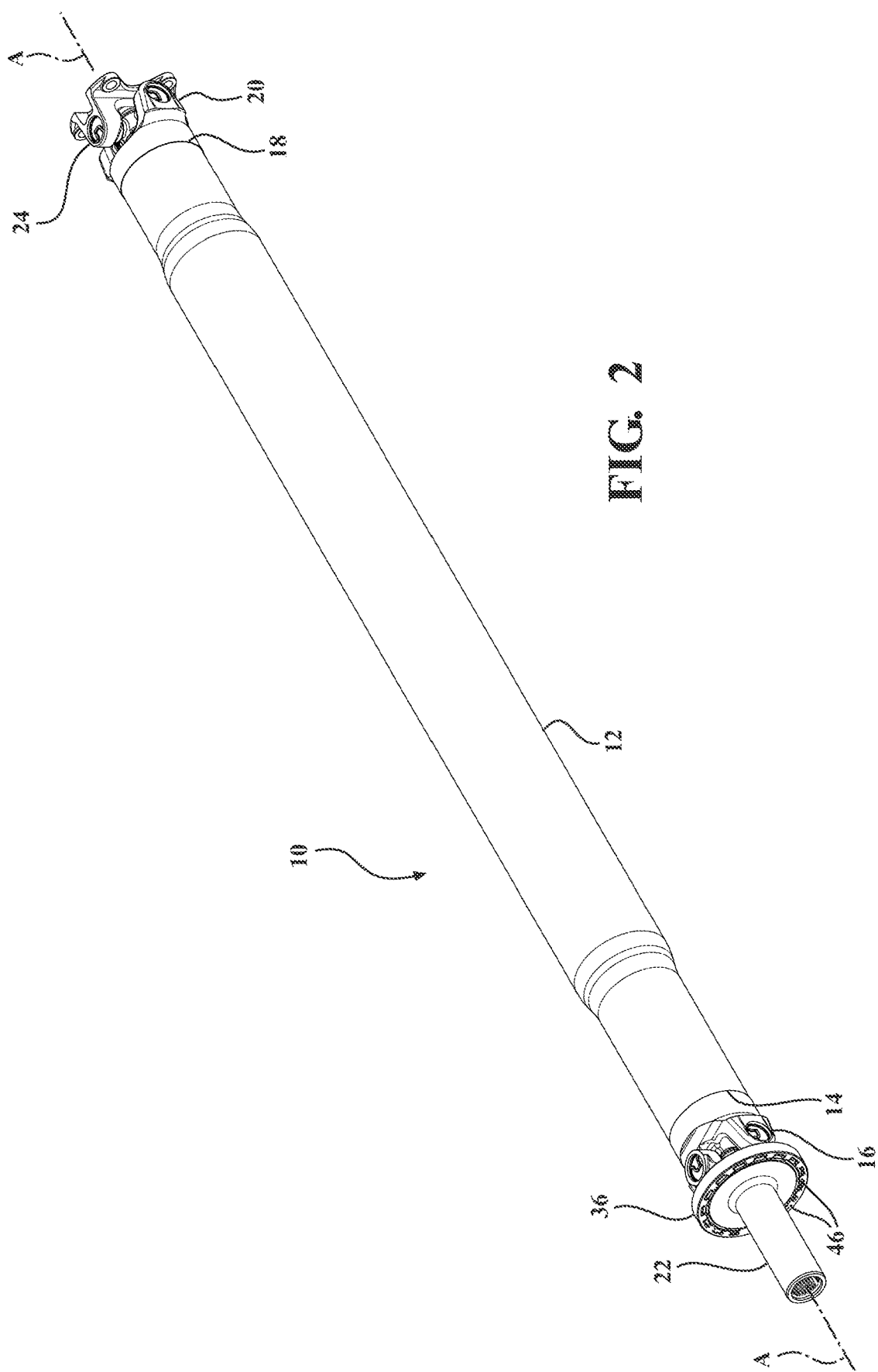
FIG. 2 is a perspective view of the propeller shaft assembly illustrating an alternative arrangement in which a first propeller shaft yoke having the tuned damper is operably connected to the first shaft end of the propeller shaft and a second propeller shaft yoke without a tuned damper is operably connected to the second shaft end of the propeller shaft.
Figure 3:
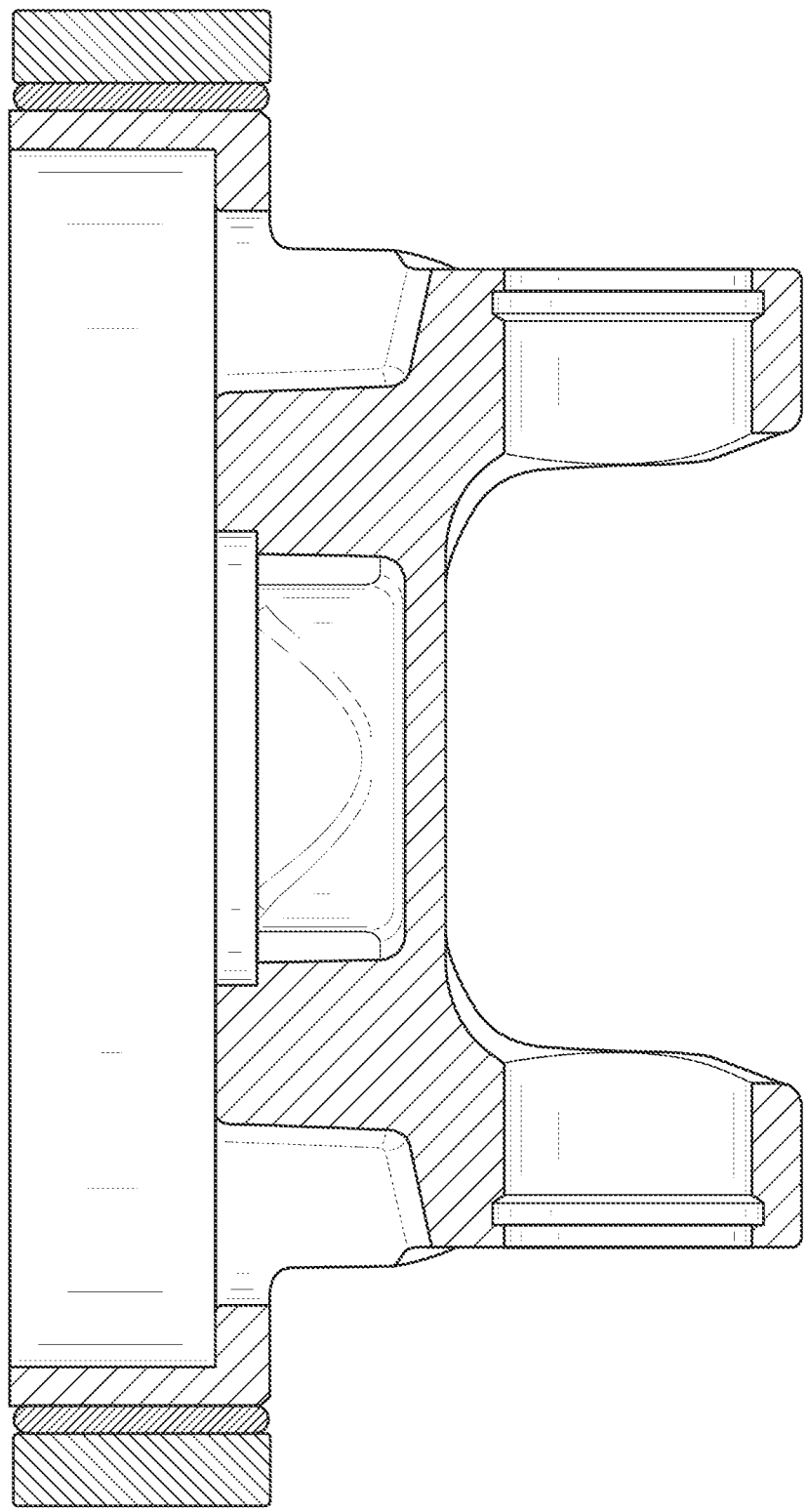
FIG. 3 is a cross-sectional view of a prior art arrangement of the second propeller shaft yoke, in this view arranged as a flange yoke, illustrating a tuned damper extending radially outwardly from a mounting surface of a mounting hub.
Figure 4:
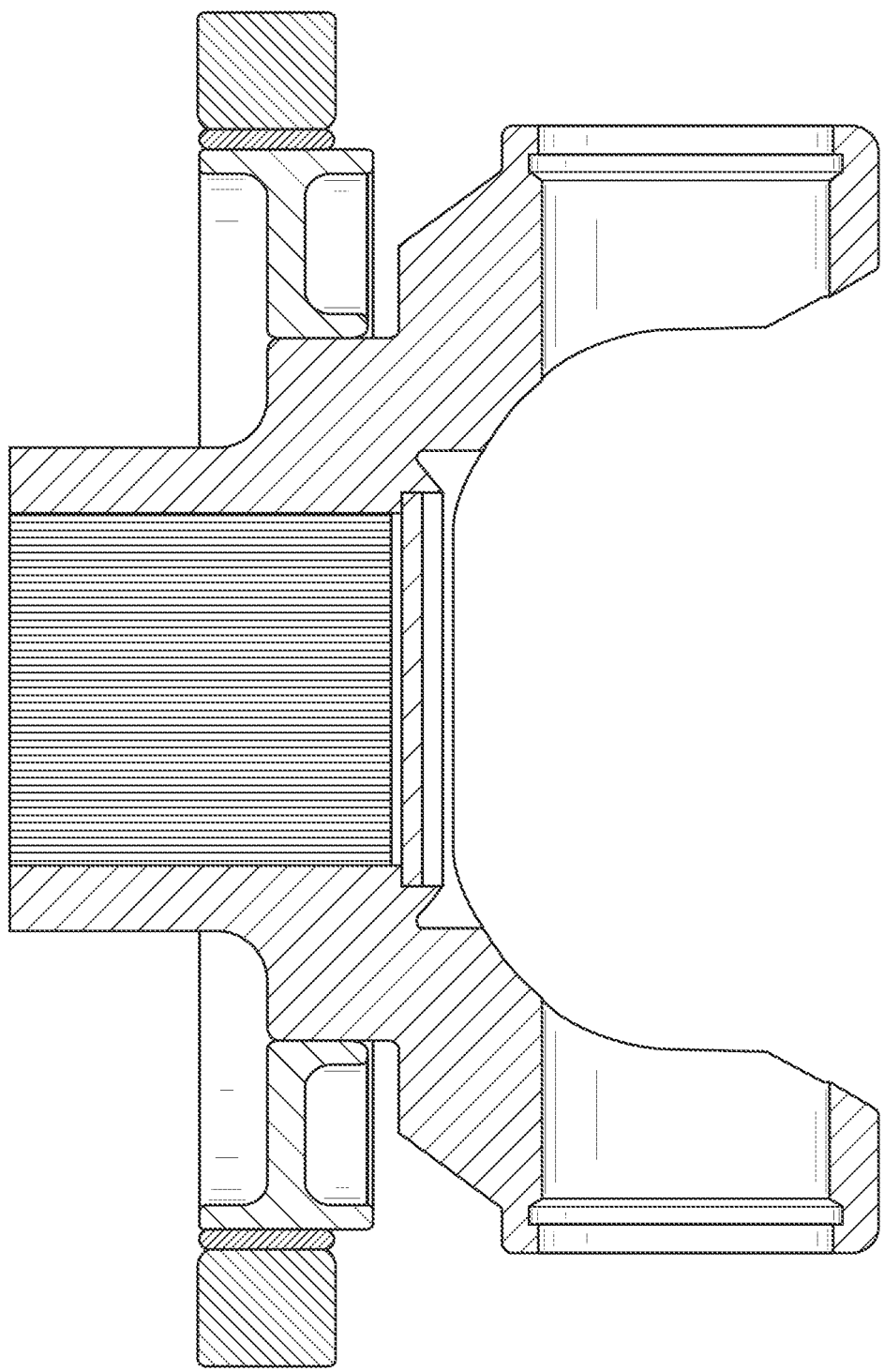
FIG. 4 is a cross-sectional view of a prior art arrangement of the first propeller shaft yoke, in this view arranged as a slip yoke, illustrating the tuned damper extending radially outwardly from the mounting surface of the mounting hub.

As best illustrated in FIGS. 1 and 2, the propeller shaft assembly 10 includes a propeller shaft 12 extending along an axis A between a first shaft end 14 having a first universal joint 16 and a second shaft end 18 having a second universal joint 20. Although the remaining disclosure of the exemplary embodiments will be described in relation to a one-piece propeller shaft, the teachings may also be practiced and applicable to a multi-piece propeller shaft without departing from the scope of the subject invention. A first propeller shaft yoke 22, such as the slip yoke shown in FIGS. 1-2 is coupled to the first universal joint 16 and may be further coupled to a powertrain transmission or transfer case of the vehicle for transmitting torque to the propeller shaft 12 from the powertrain transmission or transfer case. As understood by one of ordinary skill in the art, the first propeller shaft yoke 22 may be a slip yoke or a stud yoke depending on whether an internally splined yoke (i.e., a slip yoke) or an externally splined yoke (i.e., a stud yoke) is required to establish attachment of the propeller shaft 12 to the powertrain transmission or transfer case. A second propeller shaft yoke 24, such as the flange yoke illustrated in FIGS. 1-2, is coupled to the second universal joint 20 and may be further coupled to a differential of the vehicle for transferring torque from the propeller shaft 12 to the differential.

Figure 5:
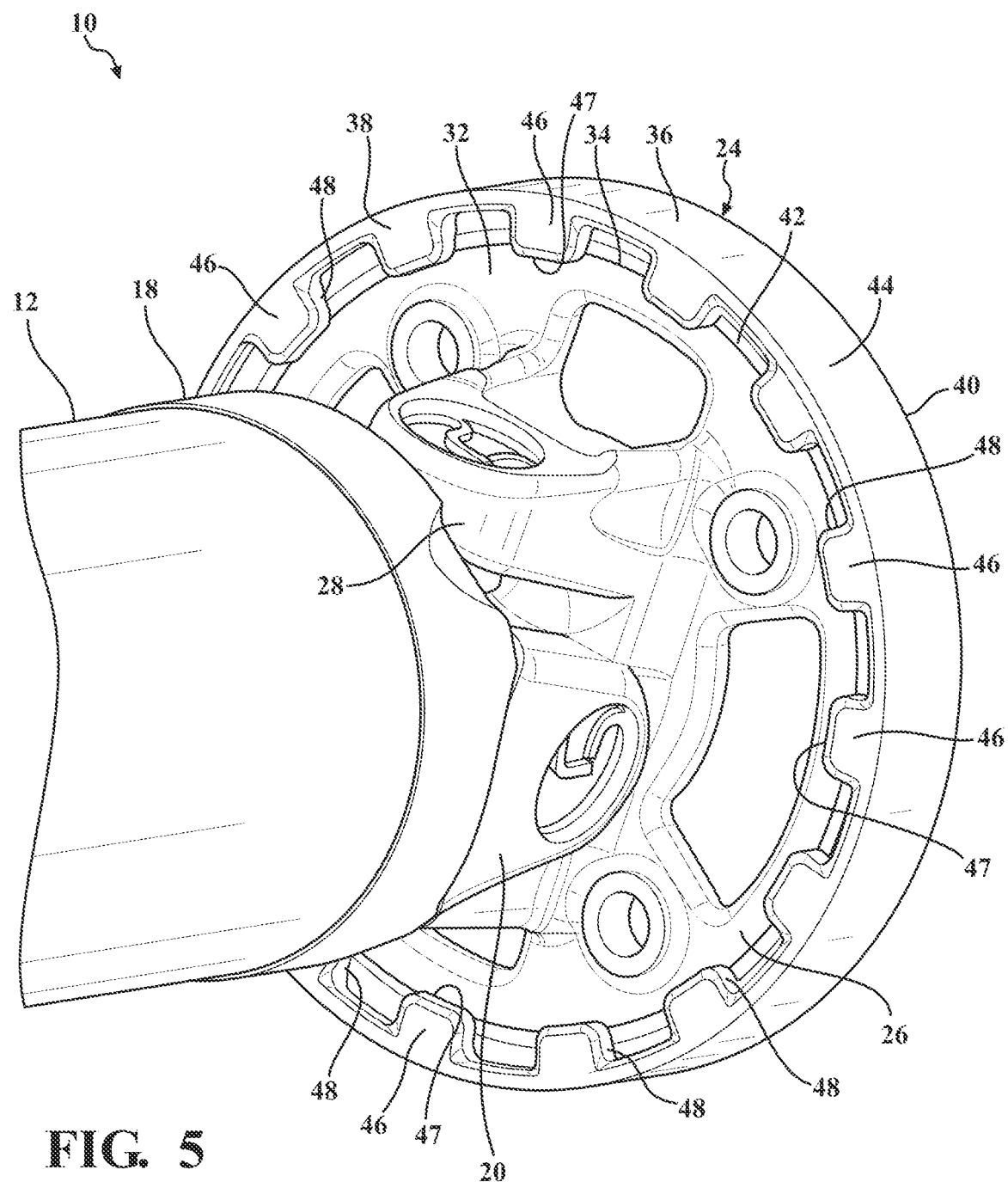
FIG. 5 is a perspective view of the second propeller shaft yoke, in this view arranged as a flange yoke, operably connected to the second shaft end of the propeller shaft and illustrating the tuned damper including a retention lip extending radially downwardly from the second damper ring adjacent the first damper side and defining a plurality of windows or apertures disposed in circumferentially spaced relationship with one another.
Figure 6:
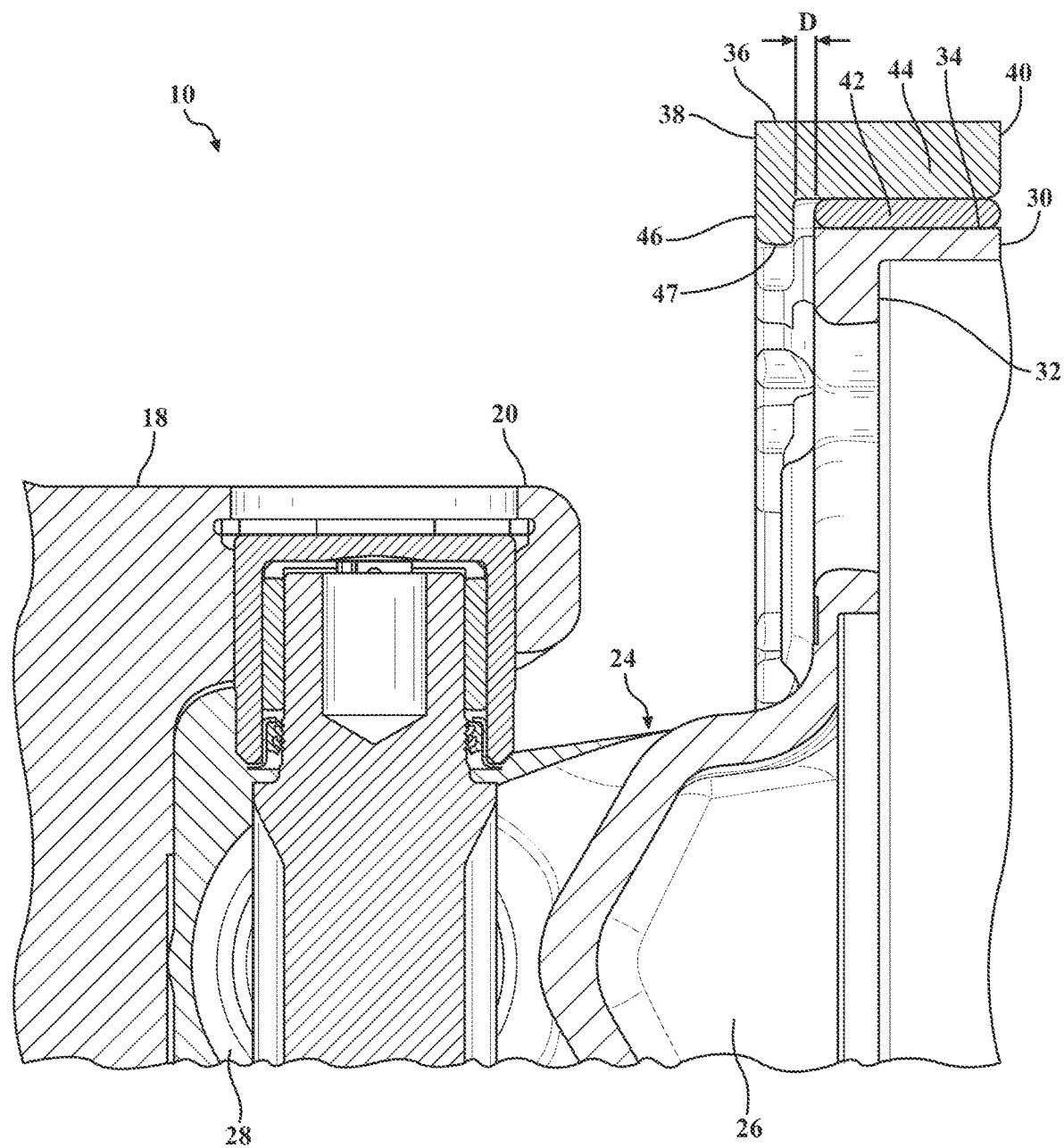
FIG. 6 is a cross-sectional view of the second propeller shaft yoke illustrated in FIG. 5 illustrating the retention lip disposed in axially spaced relationship with the mounting hub by an axial spacing distance D.
Figure 7:
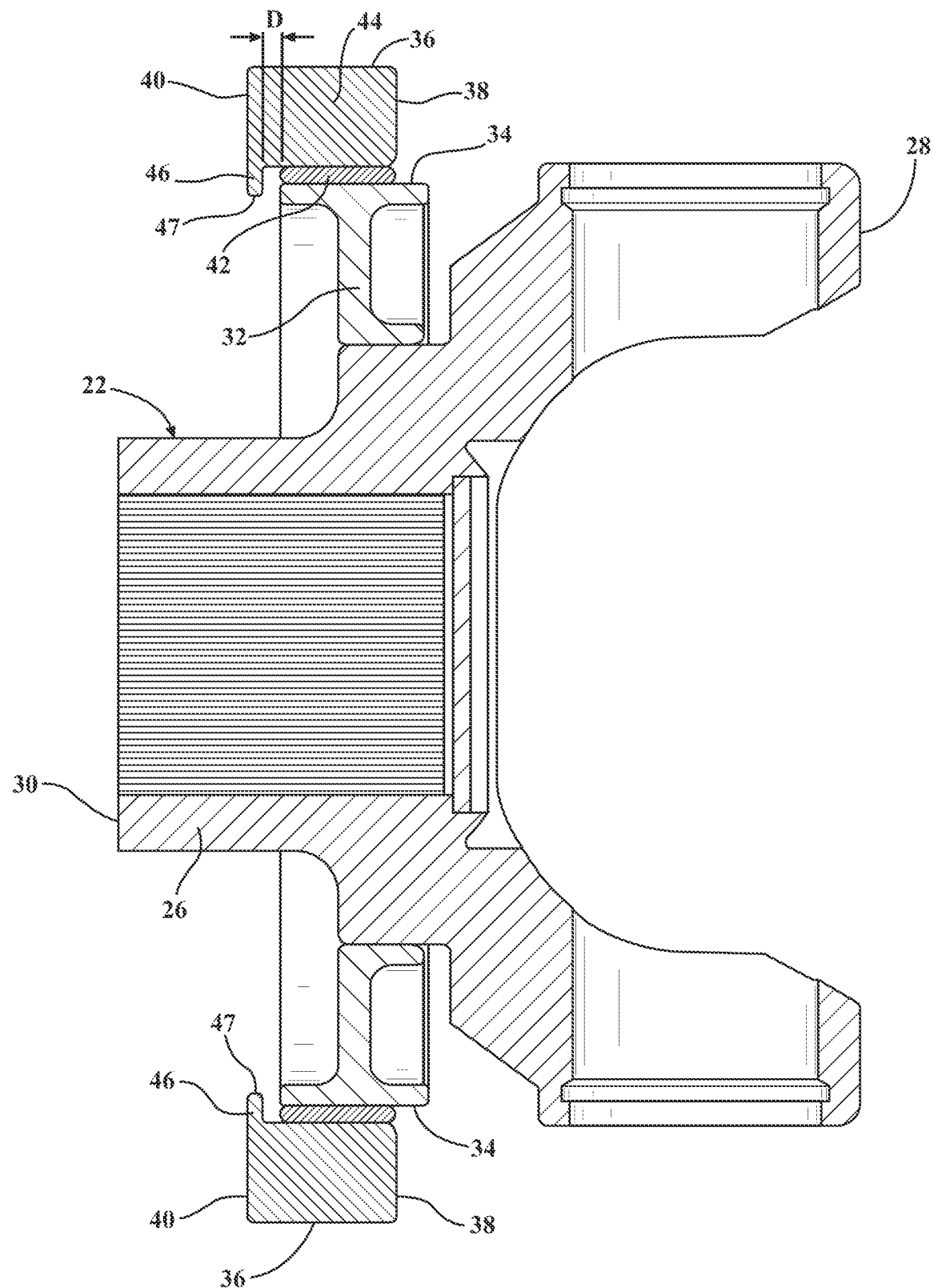
FIG. 7 is a cross-sectional view of the first propeller shaft yoke, in this view arranged as a slip yoke, and illustrating the tuned damper including the retention lip extending radially downwardly from the second damper ring.

As best illustrated in FIGS. 5-7, the first or second propeller shaft yokes 22, 24 include a body 26 extending from a first yoke end 28 disposed adjacent and operably coupled with a respective first or second shaft end 16, 18 of the propeller shaft 12 to a second yoke end 30 for coupling with the corresponding driveline component (e.g., the powertrain transmission, the transfer case, or the differential). The body 26 of the first or second propeller shaft yoke 22, 24 includes a mounting hub 32 presenting a mounting surface 34 extending preferably parallel with and circumferentially about the axis A. The mounting hub 32 accommodates a tuned damper 36 which extends radially outwardly from the mounting surface 34 of the propeller shaft yoke 22, 24 for reducing, cancelling or countering noise, vibration and/or harshness (NVH) generated during operation of the propeller shaft assembly 10. For example, as best illustrated in FIGS. 2 and 7, the tuned damper 36 can be incorporated into the first propeller shaft yoke 22, such as in the slip yoke. Alternatively, and as best illustrated in FIGS. 1 and 5-6, the tuned damper 36 can be incorporated into the second propeller shaft yoke 24, such as in the flange yoke. In either arrangement, and as best illustrated in FIGS. 5-7, the tuned damper 36 extends upwardly from the mounting surface 34 to define a first damper side 38 disposed adjacent the first yoke end 28 for facing the propeller shaft 12 and a second damper side 40 disposed adjacent the second yoke end 30 for facing the driveline component to which the respective propeller shaft yoke 22, 24 is to be coupled.

As best illustrated in FIGS. 6-7, the tuned damper 36 includes a first damper ring 42 and a second damper ring 44. The first damper ring 42 is disposed in encircling and abutting relationship with the mounting surface 34 of the propeller shaft yoke 22, 24 and is comprised of a flexible material, such as plastic, synthetic or natural rubber, or elastomeric material (herein referred to as an "elastomeric damping ring"). The second damper ring 44 is disposed in encircling and abutting relationship with the first damper ring 42 and is comprised of a light-weight steel or iron material (herein referred to as a "mass inertia ring"). Due to the flexible configuration of the first damper ring 42, it may be disposed via an interference fit between the mounting surface 34 of the first or second propeller shaft yoke 22, 24 and the second damper ring 44. The size and weight of both the first damper ring 42 and the second damper ring 44 are selectively chosen based on the frequency of vibration present at the first or second propeller shaft yoke 22, 24. In other words, depending on the type, amount and/or magnitude of the offensive and/or unwanted NVH that is being reduced and/or cancelled, a mass and/or material of the first and second damper rings 42, 44 can be changed to correspond with the desired performance of the tuned damper 36.

As best illustrated in FIGS. 5-7, one of the first or second damper sides 38, 40 of the tuned damper 36 includes a retention lip 46 extending radially downwardly from the second damper ring 44 to a retention lip end 47 to dispose the retention lip 46 in axially spaced relationship with the mounting hub 32 by an axial spacing distance D. The retention lip 46 is also preferably disposed in spaced relationship with the first damper ring 42 by the same axial spacing distance D. However, the retention lip 46 could be disposed in spaced relationship with the first damper ring 42 by a different (e.g., smaller) axial distance, or not at all, without departing from the scope of the subject disclosure. As best illustrated in FIGS. 1 and 5-6, the retention lip 46 extends circumferentially about the first damper side 38 of the tuned damper 36 and is preferably integrally formed with the second damper ring 44. As best illustrated in FIGS. 2 and 7, the retention lip 36 can alternatively extend about the second damper side 40 of the tuned damper 36. In either arrangement, the retention lip 46 provides a mechanical protective shield for the tuned damper 36 that limits the axial displacement that can occur during an impact, and thus prevents dislodging of the tuned damper 36 from the axial forces applied during contact with another object, whether during shipping, vehicle assembly, or vehicle use. Put another way, the retention lip 46 may be applied to limit axial displacement or prevent separation for tuned dampers 36 utilizing radial compression fit, adhesive bonding, or a combination of both methods for securing the second damper ring 44 and the first damper ring 42 to the mounting surface 34 of the first or second propeller shaft yoke 22, 24.

As best illustrated in FIGS. 6-7, the retention lip 46 is axially spaced from the mounting hub 32 by the axial spacing distance D to ensure that the tuned damper 36 can resonate or oscillate rotationally with respect to the mounting surface 34 to perform its dynamic damping function at the targeted tuning frequency, without grounding statically against the mounting hub 32 to which the first damper ring 42 is mounted. The axial spacing distance D between the retention lip 46 and the mounting hub 32 may be set minimally, such that any temporary displacement induced from an impact to the second damper ring 44 is absorbed within the elastic limits of the first damper ring 42, resulting in spring back without slippage, avoiding permanent displacement of the first damper ring 42 or the second damper ring 44 once a temporary external force is removed.

A potential drawback of a closely spaced retention lip 46 is that road moisture, mud, and other contaminants such as dirt, sand, stones, pebbles, debris, etc. may contact the rotating first or second propeller shaft yoke 22, 24 and be flung radially outward by centrifugal forces induced by a rotating surface of the first or second propeller shaft yoke 22, 24, causing contaminants to be forced into the axial gap (i.e., axial spacing distance D) between the retention lip 46 and the mounting hub 32. Over time, these contaminants may build up and harden in this axial gap, grounding the tuned damper 36 to the mounting hub 32 and preventing the second damper ring 44 (i.e., inertia mass ring) from functioning as an oscillatory tuned resonance damper. To overcome this concern, the retention lip 46 defines a plurality of windows or apertures 48 disposed in circumferentially spaced relationship with one another to establish an escape path for contaminants, allowing road moisture to flush out the contaminants and prevent excessive build-up in the axial gap (i.e., axial spacing distance D) that might otherwise prevent the intended oscillatory resonance damping of the tuned vibration damper. As best illustrated in FIGS. 1-2 and 5, the plurality of apertures 48 preferably extend upwardly from the retention lip end 47 and terminate in spaced relationship with an exterior surface of the second damper ring 40. However, the apertures 48 could also be arranged as weep holes or in window-like fashion, as examples, without departing form the scope of the subject disclosure.

Obviously, many modifications and variations of the present invention are possible in light of the above teachings and may be practiced otherwise than as specifically described. Individual elements or features of a particular embodiment are generally not limited to that particular embodiment, but, where applicable, are interchangeable and can be used in a selected embodiment, even if not specifically shown or described.

What is claimed is:

1. A propeller shaft yoke comprising:
   a body extending along an axis A from a first yoke end for coupling with a propeller shaft and a second yoke end for coupling with a vehicle driveline component;
   said body presenting a mounting surface extending circumferentially about said axis A;
   a tuned damper extending radially outwardly from said mounting surface to define a first damper side disposed adjacent said first yoke end and a second damper side disposed adjacent said second yoke end;
   said tuned damper including a first damper ring disposed in abutting and encircling relationship with said mounting surface and a second damper ring disposed in abutting and encircling relationship with said first damper ring; and
   one of said first or second damper sides of said tuned damper including a retention lip extending radially downwardly from said second damper ring and past said first damper ring to a retention lip end disposed in adjacent and axially spaced relationship with said said mounting hub to define an axial spacing distance D between said retention lip and said mounting hub.

2. The propeller shaft yoke as set forth in claim 1, wherein said retention lip defines a plurality of apertures disposed in circumferentially spaced relationship with one another for establishing an escape path for contaminant build-up in said axial spacing distance D disposed between said retention lip and said mounting hub.

3. The propeller shaft yoke as set forth in claim 2, wherein each of said plurality of apertures extend radially upwardly from said retention lip end.

4. The propeller shaft assembly as set forth in claim 1, wherein said retention lip is integrally formed with said second damper ring.

5. The propeller shaft assembly as set forth in claim 1, wherein said retention lip extends circumferentially about said first damper side of said tuned damper.

6. The propeller shaft assembly as set forth in claim 1, wherein said retention lip extends circumferentially about said second damper side of said tuned damper.

7. The propeller shaft assembly as set forth in claim 1, wherein said propeller shaft yoke is comprised of a flange yoke.

8. The propeller shaft assembly as set forth in claim 1, wherein said propeller shaft yoke is comprised of a slip yoke.

9. The propeller shaft assembly as set forth in claim 1, wherein said propeller shaft yoke is comprised of a stud yoke.

10. The propeller shaft assembly as set forth in claim 1, wherein said first damper ring is comprised of a flexible material and said second damper ring is comprised of a steel or iron material.

11. A propeller shaft assembly for connection to a vehicle driveline component, the propeller shaft assembly comprising:
    a propeller shaft extending along an axis A between a first shaft end and a second shaft end;
    a propeller shaft yoke operably connected to one of said first or second shaft ends of said propeller shaft;
    said propeller shaft yoke including a body extending from a first yoke end disposed adjacent said respective first or second shaft end to a second yoke end for coupling with the vehicle driveline component;
    said body presenting a mounting surface extending circumferentially about said axis;
    a tuned damper extending radially outwardly from said mounting surface to define a first damper side disposed adjacent said first yoke end and a second damper side disposed adjacent said second yoke end;
    said tuned damper including a first damper ring disposed in abutting and encircling relationship with said mounting surface and a second damper ring disposed in abutting and encircling relationship with said first damper ring; and
    one of said first or second damper sides of said tuned damper including a retention lip extending radially downwardly from said second damper ring and past said first damper ring to a retention lip end disposed in adjacent and axially spaced relationship with said mounting hub to define an axial spacing distance D between said retention lip and said mounting hub for protecting said tuned damper from axial impact forces.

12. The propeller shaft assembly as set forth in claim 11, wherein said retention lip defines a plurality of apertures disposed in circumferentially spaced relationship with one another for establishing an escape path for contaminant build-up in said axial spacing distance D between said retention lip and said mounting hub.

13. The propeller shaft assembly as set forth in claim 12, wherein each of said plurality of apertures extend radially upwardly from said retention lip end.

14. The propeller shaft assembly as set forth in claim 11, wherein said retention lip is integrally formed with said second damper ring.

15. The propeller shaft assembly as set forth in claim 11, wherein said retention lip extends circumferentially about said first damper side of said tuned damper.

16. The propeller shaft assembly as set forth in claim 11, wherein said retention lip extends circumferentially about said second damper side of said tuned damper.

17. The propeller shaft assembly as set forth in claim 11, wherein said propeller shaft yoke is comprised of a flange yoke.

18. The propeller shaft assembly as set forth in claim 11, wherein said propeller shaft yoke is comprised of a slip yoke.

19. The propeller shaft assembly as set forth in claim 11, wherein said propeller shaft yoke is comprised of a stud yoke.

20. The propeller shaft assembly as set forth in claim 11, wherein said first damper ring is comprised of a flexible material and said second damper ring is comprised of a steel or iron material.

* * * * *